Sept. 19, 1944.   H. F. PATTERSON   2,358,473
FLUID COUPLING
Filed Oct. 29, 1938   2 Sheets-Sheet 1

INVENTOR
Herbert F. Patterson.
BY Harness, Dicke, Patel & Harris
ATTORNEYS.

Sept. 19, 1944.  H. F. PATTERSON  2,358,473
FLUID COUPLING
Filed Oct. 29, 1938  2 Sheets-Sheet 2
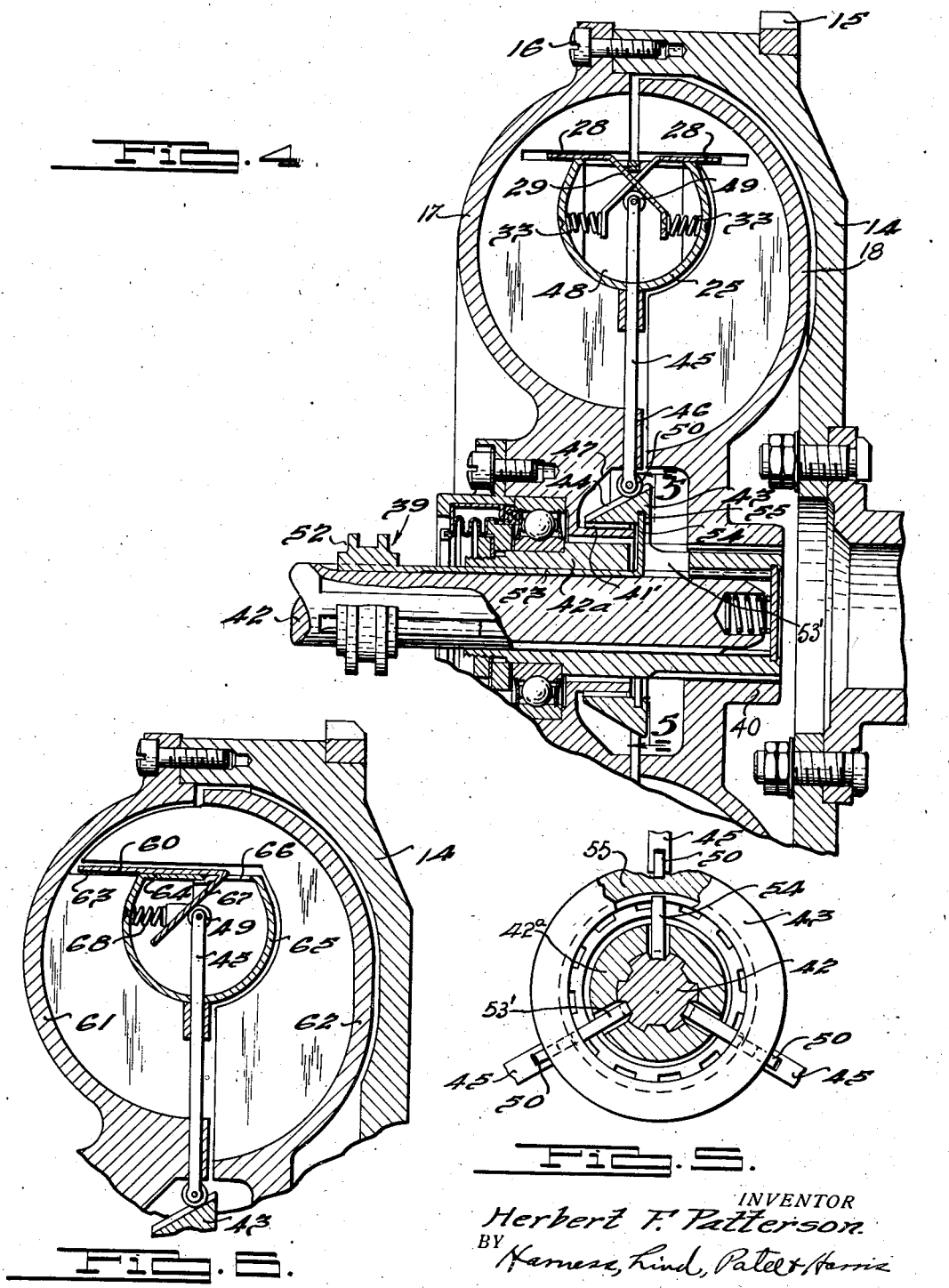
INVENTOR
Herbert F. Patterson
BY
Harness, Lind, Patel & Harris
ATTORNEYS.

Patented Sept. 19, 1944

2,358,473

UNITED STATES PATENT OFFICE 2,358,473

FLUID COUPLING

Herbert F. Patterson, St. Clair Shores, Mich., assignor to Chrysler Corporation, Highland Park, Mich., a corporation of Delaware Application October 29, 1938, Serial No. 237,649

13 Claims. (Cl. 60—54)

This invention relates to power transmitting devices and more particularly to fluid couplings, clutches, drives and the like.

Heretofore in motor vehicle power transmission systems employing fluid couplings, difficulty has been experienced by reason of a tendency of the vehicle to "creep" or drive slowly when the engine is idling and the transmission is in gear. In other words, it has been found necessary in bringing the vehicle to rest, to manipulate the transmission into neutral or to apply the usual brakes to oppose the drive or drag transmitted through the fluid coupling at engine idling speed.

It is the main object of this invention to materially reduce the aforesaid difficulties by providing an improved fluid coupling having a fluid control member by means of which the fluid flow between the passages of the impeller and runner members is effectively controlled at a location closely adjacent the point where the fluid enters the runner from the impeller.

Another object of the invention is to provide fluid control mechanism for a fluid coupling of this kind which is housed substantially within the vortex space of the impeller and runner structures thereby obviating the necessity for any substantial increase in the over-all length of the fluid coupling.

Another object of the invention is to provide a manual control for a fluid coupling of this character by means of which the fluid flow in the passages of the impeller and runner members may be controlled to any desired degree under substantially any condition.

An additional object of the invention is to provide a fluid coupling of this character in which the fluid control member is responsive to predetermined speeds of rotation of either one or both of the rotating coupling members.

An additional object of the invention is to provide a fluid coupling of this character in which the individual fluid control members in the impeller and runner structures respectively act to control the flow.

A further object of the invention is to provide an improved fluid coupling which may be easily and readily balanced, both statically and dynamically, and which will maintain said balance without further attention.

A still further object is to provide a manually controlled fluid coupling of this nature that comprises a shiftable baffle ring which is coaxial with and adapted to be interposed between the registering vanes of each of the impeller and runner members, which have vane portions registering with each other at substantially the maximum outer diameter of the impeller and runner members.

Further objects and advantages of the invention will be apparent from the following detailed illustrative embodiments of the principles of the invention, reference being had to the accompanying drawings in which:

Fig. 4 is a fragmentary sectional view corresponding to Fig. 1 but illustrating a modified form of the invention.

Fig. 5 is a vertical sectional view taken approximately as indicated by the line 5—5 of Fig. 4.

Fig. 6 is a fragmentary sectional view corresponding to Fig. 4 but illustrating still another modification of the invention.

Figures 1, 2, 3:
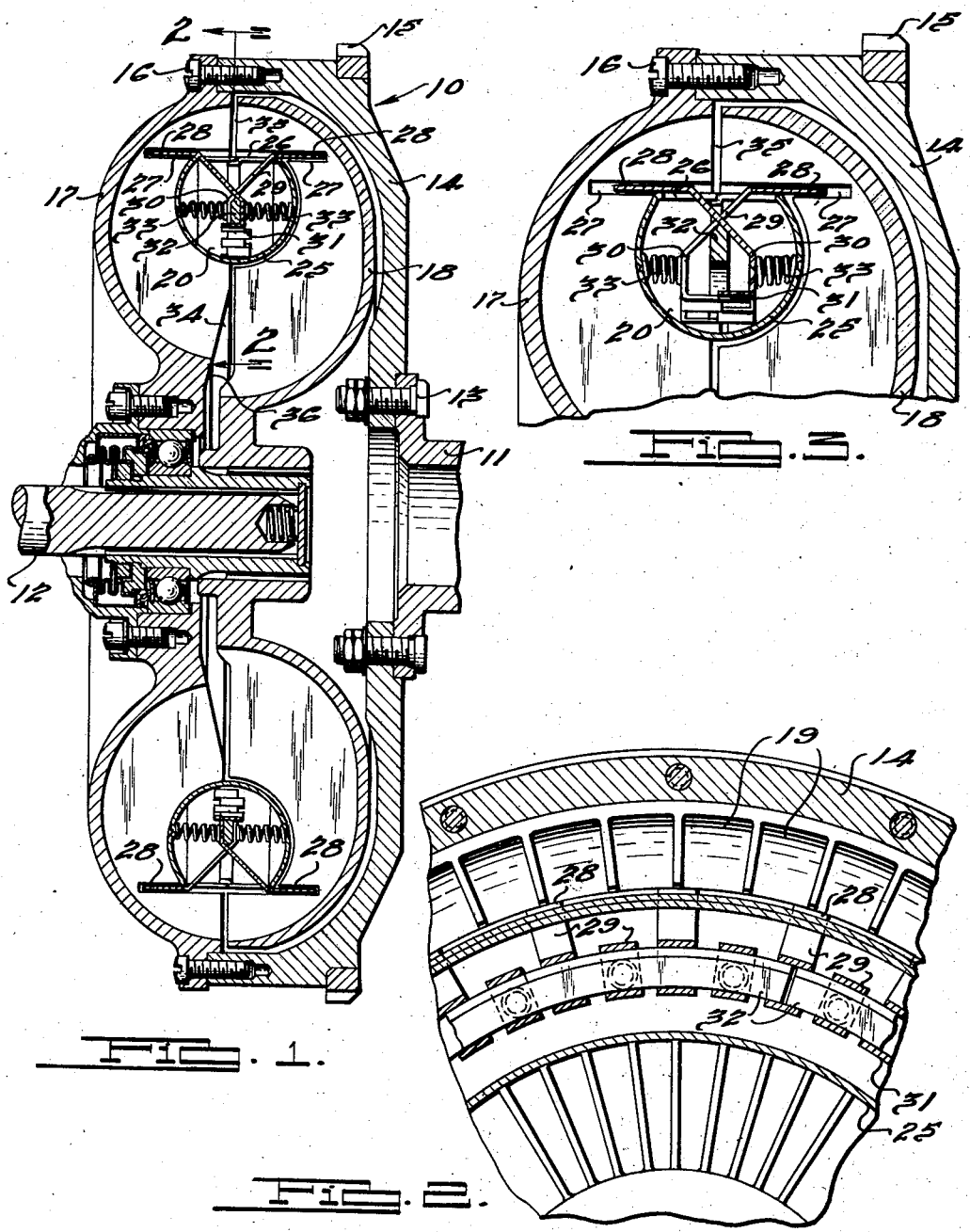
Fig. 1 is a sectional view axially through the improved fluid coupling.
Fig. 2 is an enlarged vertical sectional view taken approximately as indicated by the line 2—2 of Fig. 1.
Fig. 3 is a fragmentary sectional view corresponding to Fig. 1 but illustrating the automatic fluid control mechanism in another of its positions.

In the form of the invention illustrated in the drawings, the improved fluid coupling, generally designated by the numeral 10, is interposed between a power driving shaft 11, such as an engine crankshaft, and the driven shaft 12. The driving shaft 11 is drivingly connected by means of bolts 13 to a fly-wheel 14 having starter teeth 15 adapted for engagement with the usual engine starting device (not illustrated herein but of well-known construction), the fly-wheel 14 having secured thereto by bolts 16 the impeller or driving member 17 of the fluid coupling.

The driven shaft 12 of the fluid coupling corresponds to the driving shaft which ordinarily connects the clutch of a vehicle to the transmission mechanism thereof. A runner or driven member 18 of the fluid coupling is non-rotatably mounted on the shaft 12.

In the impeller 17 and the runner 18 are vane-formed passages 19 (as best shown in Fig. 2) which extend around an annular vortex chamber or space 20 so that as the impeller rotates, the fluid will be thrown outwardly and toward the passages 19 of the runner 18, inducing rotation of the latter as is generally well-known in the art.

The vortex chamber 20 is formed of an annular tube 25 preferably having a plurality of circumferentially spaced slots 26 on its outer circumference. The tube 25 is coaxial with and fixed to the impeller, although the tube 25 may be secured to the runner if desired without departing from the scope of the invention. Formed in the impeller and runner members are a pair of annular recesses 27 which are in alignment and are coaxial with the impeller and runner members.

Within each of the recesses 27 a shiftable baffle ring 28 is received which has a plurality of circumferentially spaced finger portions 29 extending in crossed relationship into the center portion of the vortex chamber 20. Each of the fingers 29 has parallel portions 30 and co-extensible guiding end portions 31. A plurality of annularly arranged centrifugally actuated elements 32 are receivable between the parallel portions 30, outward and inward movement of the elements 32 being limited by the crossed portions of the fingers 29 and the co-extensible end portions 31, respectively. Yieldable means, such as springs 33, are interposed between the side walls of the tube 25 and the parallel portions 30 of the fingers 29 to yieldingly hold the finger portions 30 in their central position within the vortex chamber 20.

The arrangement of the baffle rings 28 and the centrifugal weights 32 is such that when the driving and driven shafts 11 and 12 respectively are rotating at a relatively slow speed the rings 28 will be moved to the extremities of the recesses 27 under the influence of the springs 33 so as to simultaneously disrupt the flow of fluid in each of the vane-formed passages 19 of the impeller and runner members 17 and 18 respectively. The effective length of the recesses 27 into the vane-formed passages 19 may be so extended or shortened to allow the rings 28 to close off the vane-formed passages 19 sufficiently to effect the operating characteristics desired.

When the driving or driven shaft 11 or 12 respectively is rotating at a relatively high speed the centrifugally actuated weights 32 are urged outwardly by centrifugal force against the crossed portions of the fingers 29 to urge the rings 28 inwardly toward each other so that the rings are taken substantially out of the vane-formed passages 19 whereby unrestricted flow of fluid is effected.

It is normally desirable to fill the fluid coupling to about three-fourths of its capacity, the fluid being oil, water or other suitable material. As the driving shaft is rotated at an increasing rate of speed the centrifugal force on the fluid becomes greater and greater and consequently forces the fluid in its well-known travel in the outer portions of the vane-formed passages 19. In other words, the impeller 17 will rotate with the driving fly-wheel 14 to cause the fluid to circulate under the action of centrifugal force from the space 34 outwardly through the impeller vane passages for discharge in the space 35 where the fluid enters the runner vane passages for discharge at the space 34. The runner is thus driven by the impeller and the slippage between the elements rapidly diminishes as the speed of the impeller increases in the manner well known in the art.

In the operation of this particular embodiment of the invention, when the driving shaft 11 is rotating faster than the driven shaft 12, but at a relatively slow speed, the rings 28 are maintained in their illustrated positions of Fig. 1 wherein they simultaneously interrupt the fluid flow in each of the vane-formed passages of the impeller and runner 17 and 18 respectively. This interruption of the fluid flow in the vane-formed passages lowers the energy transmitted to the runner 18 and consequently effects greater slippage between the impeller and the runner. This action makes it unnecessary to manipulate the transmission into neutral, or to apply the brakes of a motor vehicle in order to hold the latter at rest. If desired, a baffle member such as an off-set portion 36 of the impeller may be used to assist the function of the baffle rings 28. When the vehicle operator increases the speed of the driving shaft 11, the centrifugally actuated elements 32 are urged outwardly to move the baffle rings 28 toward each other out of the vane-formed passages to facilitate unrestricted fluid flow. The rings 28 are similarly effective in disrupting fluid flow when the runner tends to drive the impeller as when the motor vehicle is coasting down hill.

The rings 28 are novelly arranged so as to simultaneously control the fluid passage in the impeller and runner members 17 and 18 respectively and are carried at a location on the fluid coupling closely adjacent the outer diameter of the vortex tube 25, and thereby are adapted to efficiently control the fluid flow at a point where the fluid registers substantially its maximum velocity.

It is evident that the improved fluid coupling, with its self-contained baffle rings 28 and control mechanism therefor compactly housed entirely within the vortex chamber 20, can be easily balanced and maintained in balance and moved as a unit. This feature is of tremendous advantage in motor vehicle installations where occasional removal and replacement may be necessary.

Referring now to Figs. 4 and 5 wherein is illustrated a somewhat slightly modified embodiment of the invention, it will be noted that the impeller and runner elements 17 and 18 have been undercut to provide a chamber 47 and the co-extensible end portions 31 of the fingers 29 have been omitted and that the impeller has a splined hub portion 41'. An actuating collar 43 is non-rotatably mounted on the splined hub 41' for longitudinal sliding movement relative to the impeller 17. The collar 43 is provided with a plurality of circumferentially spaced rearwardly-inclined cam surfaces 44. A plurality of actuating rods 45 are slidably mounted in the impeller structure 17 as at 46 and extend into the chamber 47 and vortex chamber 48. Rollers 49 and 50 are rotatably mounted at each end of the rod 45. Roller 49 bears on the under side of one of the crossed portions of the fingers 29 and roller 50 rides in a groove on the cam surface 44 of the actuating collar 43.

It will thus be apparent that movement of the collar 43 toward the left of Fig. 4 causes the actuating rod 45 to move upwardly thereby moving the baffle rings 28 toward each other and out of the vane-formed passages of the impeller and runner elements. Conversely, movement of collar 43 toward the right allows the rod 45 to move downwardly under the influence of springs 33 which force the baffle rings into the vane-formed passages.

A suitable remote control such as a shift collar 52 may be used to control the shifting movement of the rods 45. The collar 43 is splined to hub 41' of the impeller 17 and is provided with a groove 55 in which the outwardly bent portions 54 of the slidable operating fingers 53 are rotatably received. A collar 52 is rigidly secured to the fingers 53 and is adapted to be actuated by a suitable control, such as, for instance, a pedal. Reciprocation of the collar 52 along the shaft 42 will thus effect corresponding reciprocation of the collar 43, the bent portions 54 of fingers 53 being slidably accommodated by the slots 53' provided in the sleeve 42a on which the hub 40 of runner 18 is splined and which is, in turn, splined on shaft 42 as shown in Figs. 4 and 5.

It is believed that the operation of the device will be obvious from the above description. It should be noted that in this modification of the invention, the exchange of fluid between the impeller and runner elements can be cut off under any condition of operation. This feature is of importance when it is desired to use the fluid coupling in conjunction with a conventional change speed transmission. With the conventional type of fluid coupling, it is impossible to shift to another gear ratio, or into neutral, when the car is travelling at high speed unless a friction clutch or its equivalent is provided between the fluid coupling and the transmission for the purpose of interrupting the transmission of power while the shift is being made. With the improved coupling just described, the collar 52 may be actuated at any time to cause the flow of fluid from the impeller to the runner to be cut off, thereby allowing the slip between the two elements to reach substantially 100% if desired, and facilitating the shift.

It will be noted that the actuating control mechanism for the rings 28 is housed substantially within the impeller and runner members to effect an easily balanced fluid coupling having a minimum of over-all length.

In Fig. 6 is shown another modification of the invention that is quite similar to the embodiment shown in Figs. 4 and 5, but differs slightly therefrom in that it has only one baffle ring 60. The arrangement of the impeller 61 and the runner 62 is such that the vanes register at a location designated at 63 which is at substantially the maximum outer diameter of the vortex chamber of the impeller and runner structures. The baffle ring 60 is slidably interposed between each of the registering vanes of the impeller 61 and the runner 62 and is slidably mounted at 64 on the outer diameter of the vortex forming tube 65. Formed on the outer circumference of the tube 65 are a plurality of circumferentially spaced slots 66 which are adapted to slidably receive a series of inwardly extending finger portions 67 of the ring 60. The rollers 49 of the rods 45 are adapted to travel along the lower sides of the fingers 67. A suitable yielding means, such as a spring 68, may be interposed between the finger portions 67 and the side walls of the vortex tube 65 to yieldingly urge the ring 60 inwardly out of fluid interrupting relationship with the vane-forming passages of the impeller and the runner 61 and 62 respectively. The collar 52 (see Fig. 4) may be adjusted to move the ring 60 to any desired position and the fluid flow between the vane members of the impeller and the runner will be interrupted accordingly. It will be noted that the baffle ring 60 is positioned at the maximum outer diameter of the impeller structure where the fluid registers its maximum velocity in the impeller structure, thereby effectively controlling the fluid flow.

Various modifications and changes may be effected in the above described modifications of the invention without departing from the spirit of the invention or from the scope of the appended claims.

I claim:

1. In a fluid coupling having an impeller rotor structure and a runner rotor structure, a plurality of vanes in each of said structures so arranged that a plurality of fluid passages are formed in each of said structures which register with one another during rotation of one rotor structure relatively to the other, an annular vortex tube coaxial with and carried by one of said rotor structures, an adjustable annular baffle member coaxial with and carried by one of said rotor structures and adapted to be moved relatively to said structure to disrupt the fluid flow in said structures, and radially shiftable means positioned within said vortex tube for controlling the movement of said baffle member during rotation of said structures.

2. In a fluid coupling having an impeller rotor structure and a runner rotor structure, a plurality of vanes in each of said structures so arranged that a plurality of fluid passages are formed in each of said structures which register with one another during rotation of one rotor structure relatively to the other, a substantially tubular vortex member carried by one of said structures and disposed coaxially relatively thereto, an adjustable annular baffle member coaxial with and carried by one of said rotor structures and adapted to be moved relatively to said structure to disrupt the fluid flow in said structures, a radially shiftable element extending within said vortex member operable to effect movement of said baffle member, and actuating means connected with said radially shiftable element for shifting the latter during rotation of said structures.

3. In a fluid coupling having an impeller rotor structure and a runner rotor structure, a plurality of vanes in each of said structures so arranged that a plurality of fluid passages are formed in each of said structures which register with one another during rotation of one rotor structure relatively to the other, an annular vortex member carried by said impeller structure for rotation therewith, an adjustable annular baffle member coaxial with and carried by said vortex member and adapted to be moved relatively to said member to disrupt the fluid flow in said structures, and manually actuated radially shiftable means for controlling the movement of said baffle member during rotation of said structures, said means being operable to move said baffle member and disrupt the fluid flow at any speed of rotation of said rotor structures.

4. In a fluid coupling having an impeller rotor structure and a runner rotor structure, a plurality of vanes in each of said structures so arranged that a plurality of fluid passages are formed in each of said structures which register with one another during rotation of one rotor structure relatively to the other, a pair of adjustable baffle members arranged coaxially with and carried by one of said rotor structures and adapted to be moved relatively to said structure to disrupt the fluid flow in the fluid passages of each of said structures.

5. A fluid coupling comprising in combination dished driving and driven elements each provided with a plurality of slotted radial vanes forming fluid passages therein, annular baffle rings positioned in the slots of said respective driving and driven elements, each of said rings having a plurality of fingers extending therefrom, means cooperating with said fingers for withdrawing said rings from said slots and separate means for inserting said rings into said slots.

6. In a fluid coupling, an impeller rotor structure comprising a fluid medium propelling portion, a runner rotor structure comprising a fluid medium driven portion, said structures having vanes forming fluid passages therein, each set of which registers with the other at substantially the maximum outer diameter of the vane passages during rotation of one of said structures relative to the other, a pair of shiftable baffle rings each of which is coaxial with and carried by one of said structures, said baffle rings being adapted to be simultaneously shifted axially of said structures to disrupt the fluid flow in each of the passages of said impeller and runner structures simultaneously, and means automatically responsive to the speed of rotation of said one structure for controlling the simultaneous shifting movement of said baffle rings during rotation of said structures.

7. In a fluid coupling, an impeller rotor structure comprising a fluid medium propelling portion, a runner rotor structure comprising a fluid medium driven portion, said structures having vanes forming fluid passages therein, each set of which registers with the other at substantially the maximum outer diameter of the vane passages during rotation of one of said structures relative to the other, said vanes being so constructed and arranged as to form a vortex chamber around which the fluid is adapted to circulate between said structures, a pair of shiftable baffle rings each of which is coaxial with and carried by one of said structures, said baffle rings being adapted to be simultaneously shifted axially of said structures to disrupt the flow in each of the passages of said impeller and runner structures simultaneously, and mechanism carried substantially within said vortex chamber of said structures for automatically controlling the degree of simultaneous shifting movement of said baffle rings in response to the rate of rotation of said impeller structure.

8. In a fluid coupling, impeller and runner members having fluid passage forming vanes so constructed and arranged as to form a vortex chamber around which the fluid is adapted to circulate between said members, a pair of shiftable baffle rings each of which is coaxial with and carried by said impeller member, said baffle rings being adapted to simultaneously shift axially of said impeller and runner members to disrupt the fluid flow in each of the passages of said members, and means including a centrifugally actuated element carried within said vortex chamber for automatically controlling in response to the rate of rotation of said impeller member the degree of shifting movement of said baffle rings.

9. In a fluid coupling, an impeller rotor structure comprising a fluid medium propelling portion, a runner rotor structure comprising a fluid medium driven portion, said structures having fluid passage forming vanes each of which registers with the other at substantially the maximum outer diameter of the vane passages during rotation of one of said structures relative to the other, a pair of shiftable baffle rings each of which is coaxial with and carried by one of said structures, said baffle rings being adapted to be simultaneously shifted axially of said structures to disrupt the flow in each of the passages of said structures simultaneously, and means for controlling from outside said structures the degree of shifting movement of said baffle rings during rotation of the structures.

10. In a fluid coupling, an impeller rotor structure comprising a fluid medium propelling portion, a runner rotor structure comprising a fluid medium driven portion, said structures having fluid passage forming vanes each of which registers with the other at substantially the maximum outer diameter of the vane passages during rotation of one of said structures relative to the other, said fluid passage forming vanes being so constructed and arranged as to form a vortex chamber around which the fluid is adapted to circulate between said structures, a pair of shiftable baffle rings each of which is coaxial with and carried by one of said structures, said baffle rings being adapted to be simultaneously shifted axially of said structures to disrupt the flow in each of the passages of said structures simultaneously, baffle ring control mechanism within said structures and a remote control element outside said structures for adjusting the degree of shifting movement of said baffle rings during rotation of said structures.

11. In a fluid coupling of the type including driving and driven rotors defining a fluid circulating circuit and in which the driven rotor is driven by flow of pressure fluid impelled by the driving rotor, in combination, a fixed baffle disposed in the fluid circulating circuit adjacent the inner diameter thereof, and an adjustable baffle disposed in the fluid circulating circuit adjacent the outer diameter thereof and adapted for movement into fluid disrupting position whereby fluid circulation between said rotors may be substantially cut off at low speeds of rotation of the driving rotor.

12. In a fluid coupling of the type including driving and driven rotors defining a fluid circulating circuit and in which the driven rotor is driven by flow of pressure fluid impelled by the driving rotor, in combination, a fixed baffle disposed in the fluid circulating circuit adjacent the inner diameter thereof, an adjustable baffle disposed in the fluid circulating circuit adjacent the outer diameter thereof and adapted for movement into fluid disrupting position whereby fluid circulation between said rotors may be substantially cut off at low speeds of rotation of the driving rotor, and means responsive to the rotational speed of said driving rotor for controlling the position of said adjustable baffle.

13. In a hydraulic transmission device, an impeller member and a runner member cooperating to form a fluid working circuit, means arranged substantially at the entrance and the exit of the impeller member to interrupt the fluid flow at two spaced points and thereby prevent creep of the runner member at low speeds of the impeller member.

HERBERT F. PATTERSON.